Patented Mar. 25, 1941

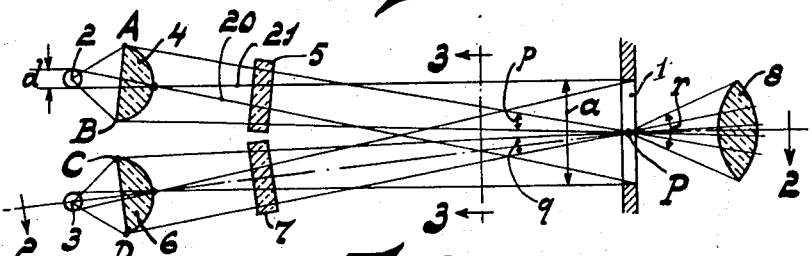
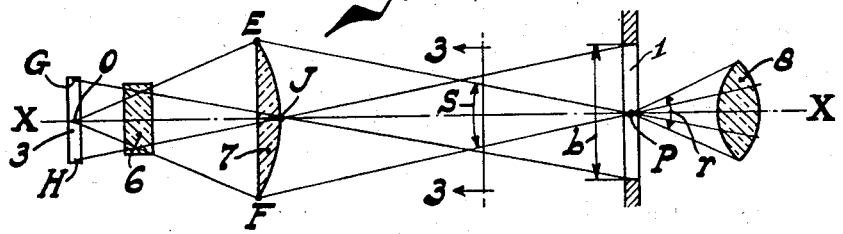
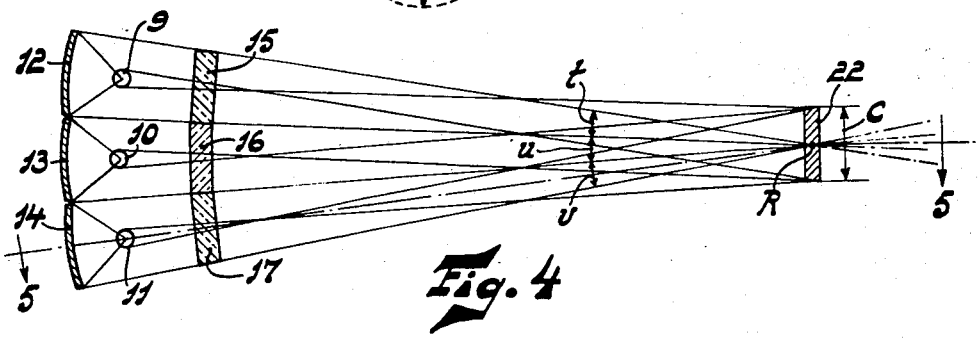
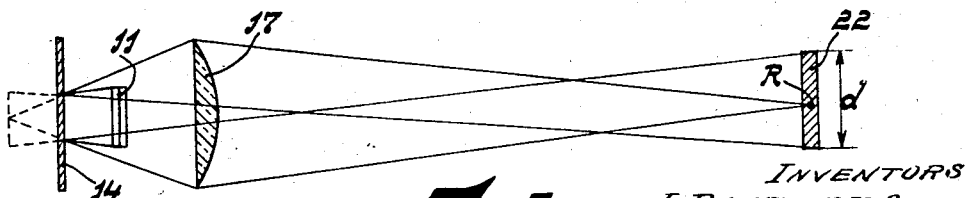

2,236,420

UNITED STATES PATENT OFFICE 2,236,420

ILLUMINATING DEVICE

Jan Bergmans, Clamor August Lamberts, and Pieter Martinus van Alphen, Eindhoven, Netherlands, assignors, by mesne assignments, to Hartford National Bank and Trust Company, Hartford, Conn., as trustee Application February 9, 1939, Serial No. 255,528
In the Netherlands February 21, 1938

7 Claims. (Cl. 88—24)

Our invention relates to a device for illuminating as intensely and as uniformly as possible a plane surface whose two dimensions do not exceed the ratio of 1 to 10.

The device according to the invention may be utilized for various purposes, but generally where a very strong illumination of a plane is desirable. For example, the invention may be utilized for illuminating the film gate of a projector, and in search-lights which are to illuminate a definite object, for example an airplane, with as great an intensity as possible.

It has been proposed to illuminate a plane surface by the light emitted from a plurality of separated punctiform light sources in which case the illumination cones of the points of the illuminated plane surface consist of a number of light cones of round cross-section. However, in such cases it is necessary to use a plurality of rows of light sources, i. e. four, nine, sixteen etc. light sources arranced in a square of two rows each containing two light sources, three rows each containing three light sources etc. In other words it is generally necessary to use $n^2$ light sources and to provide each light source with its own optical system, for example with a mirror. The beams of light from the $n^2$ light sources form together the illumination cones for the points of the plane surface to be illuminated, and therefore each illumination cone is constituted by $n^2$ partial illumination cones.

In other known devices, the arrangement is such that each of the light sources shines only on a portion of the surface to be illuminated with the result that the total illumination of that surface is effected by a plurality of light patches located next to and above each other. This has the drawback that when one of the light sources is extinguished, for example due to its becoming defective, the surface to be illuminated locally exhibits a dark spot. Furthermore, in such cases it is not feasible to use light sources of different types in order to correct the color of the light.

The object of the present invention is to overcome the above disadvantages and for this purpose we use a limited number of linear light sources which are arranged parallel to each other. Each of these light sources is provided with two optical cylindrical means which are separated from each other and whose axes are perpendicular to each other in order that the light emitted from each light source will be projected in such an enlarged manner as to overlap at least partly the light patches of the other light sources on or in the immediate vicinity of the plane surface to be illuminated and that each of these light patches will at least substantially cover the surface with light. The light sources together with their optical means are so arranged relatively to one another that the illumination cones of the points of the plane consists of a number of plane cones of light, each of which originates from one of the light sources.

In comparison with the prior device, it is necessary, when illuminating a given surface, for example a square surface, with a device according to the invention to use only two, three, four, etc., light sources arranged in parallel with each other. Thus, generally it is necessary to use only $n$ light sources which illuminate in the desired manner the plane to be illuminated with the aid of the aforementioned optical means cooperating with the light sources. If the plane to be illuminated is of rectangular section, only one row of light sources arranged in parallel relationship with one another will be generally required. The illumination cones of the points of the plane thus consist of $n$ partial plane cones, and the shape of the plane to be illuminated need not correspond with the shape of the light sources, but is dependent on the magnifications of the cylindrical optical elements.

Due to their spatially-separated arrangement, the optical cylindrical means co-operating with the light sources strongly restrict the astigmatism which would otherwise occur with the use of cylindrical elements. These means may be of different kinds; for example, we may use with each light source two cylindrical lenses, two cylindrical mirrors, or one cylindrical lens and one cylindrical mirror. Each cylindrical optical element may comprise in known manner several parts which are arranged in the immediate proximity of each other and may be cemented to one another. Owing to the action of the cylindrical means the illumination cones of the points of the plane are constituted by a number of plane cones of light. This means that each of the partial illumination cones which consequently originate from one source of light exhibits in cross-section a slightly flattened shape which is caused by the elongated shape of part of the optical elements utilized.

In one advantageous embodiment of the device according to the invention the illumination cones of the points of the plane consist of a number of plane cones of light practically adjoining each other.

When the plane to be illuminated as intensely as possible is formed by the film gate of a film projection apparatus it is desirable for a most economical use of the light radiated by the light sources to so choose the illumination cones of the points of the film gate that they will be located within the receiving angle of the projection lens arranged behind the film gate.

In order that the invention may be clearly understood and readily carried into effect, we shall describe the same in more detail with reference to the accompanying drawing in which:

Figure 1 is a sectionized view of a device according to the invention,

Fig. 2 is a section along line 2—2 of Figure 1,

Fig. 3 is a section along line 3—3 of Figures 1 and 2,

Fig. 4 is a sectional view of a device according to another embodiment of the invention, and Fig. 5 is a section along line 5—5 of Figure 4.

The device illustrated in Figures 1 and 2 is used to illuminate a film gate 1 having a length $b$ and a width $a$ which are of a similar order of magnitude and in a ratio considerable less than 10 to 1. The device comprises two linear light sources 2 and 3 arranged parallel to each other and perpendicular to the plane of the drawing in Figure 1. The light emitted by light source 2 passes through a cylindrical lens 4 whose axis extends perpendicular to the plane of Figure 1 and through a second cylindrical lens 5 whose axis is parallel to the plane of Figure 1 and perpendicular to the axis of lens 4. In a similar manner the light emitted by light source 3 passes through cylindrical lenses 6 and 7 which are similar to lenses 4 and 5 respectively and similarly arranged with respect to each other and to the light source 3.

The light sources 2 and 3 may be high-pressure mercury-vapor discharge tubes of the type described in the U. S. Patent #2,094,694 to Bol et al., but other linear light sources such as an incandescent lamp with a linear filament may be used. Furthermore, additional light sources together with lenses may be used. It should be noted that only two light sources arranged in parallel are used, and not a number of rows each containing several light sources as would be the case if punctiform light sources were used.

The light emitted from the light sources 2 and 3 is projected to form luminous patches on the film gate 1, and because of the separate arrangement the astigmatism is kept within tolerable limits.

Due to the action of the cylindrical lenses 4 and 6 the light sources 2 and 3 are enlarged in their cross section (see Fig. 1) so as to illuminate the height $a$ of the film gate. In the section of Fig. 1, the cylindrical lenses 5 and 7 have substantially no effect upon the course of the light rays, but act merely as plano-parallel glass plates. When considering a point P at the film gate 1, it appears that this point is illuminated by an illumination cone which, in the section in Fig. 1, consists of two partially-flattened illumination cones which originate from the light sources 2 and 3 respectively and have equal apical angles $p$ defined by the light rays 2—A—P and 2—B—P, and $q$ defined by light rays 3—C—P and 3—D—P. The total apical angle in this section of the cone of light at the point P is therefore $p+q$, and since the magnitude of this angle is also decisive for the brightness at this point it will be appreciated that the brightness under these circumstances, i. e. when both the light source 2 and the light source 3 are radiating light, becomes as great as possible.

Behind the film gate 1 is arranged a projection lens 8 of a film projection apparatus, and as shown in Figures 1 and 2 the receiving angle of this lens has a value $r$. The illumination cone of each of the points of the film gate has an apical angle equal to $p+q$, which is substantially equal to the receiving angle $r$ of the projection lens. It is obvious that if the receiving angle $r$ of the projection lens is materially greater than the sum of the angles $p+q$, there is no objection to adding a third light source to the light sources 2 and 3.

When considering light rays 20 and 21 passing through the extreme parts of the light sources and also through the optical center of the cylindrical lens 4, it is seen that, as previously mentioned, the thickness $d$ of each of the light sources is increased in such manner that each of the light sources is extended over the entire width $a$ of the film gate. It also appears from this that when one of the light sources is extinguished, the entire film gate 1 will remain illuminated, only the illumination cone of the point P in this case acquiring a lower value, viz. a value $p'$. As a result the film gate 1 will be illuminated only with half of the maximum brightness.

In the section of Figure 2, the light source 3 exhibits a sufficient dimension so that the light source in this direction need be only slightly enlarged to illuminate the length $b$ of the film gate. Since the necessary enlargement in this direction is only small, the apical angle S of the illumination cone will in this section generally exhibit a value which is sufficiently high. Because of this it is unnecessary to arrange a plurality of light sources above one another. The apical angle S is defined by the light rays emitted from a point of the light source, for example the center O, and passing through the extreme points E and F of the cylindrical lens 7 which is operative in this section, and also through the point P. Furthermore, from Figure 2 and mainly from the course of the light rays emerging from the extreme points G and H of the light source 3 and passing through the optical center J of the lens 7, it appears that the length of the light source is such as to fill the dimension $b$ of the film gate completely with light in this direction. In this section the lens 6 serves as a plano-parallel plate and consequently does not affect the course of the light rays to any appreciable amount. The angle S is adapted to the receiving angle 4 of the projection lens 8.

Fig. 3 shows the position of the sections in the plane III—III of Figs. 1 and 2 of the two partial illumination cones having apical angles $p$ and $q$ respectively and distinctly shows the flattened shape of these cones, the width and length of the sections being indicated by the angles of Figs. 1 and 2.

The device illustrated in Figs. 4 and 5 is intended for search-light installation, and comprises three linear light sources 9, 10 and 11, which are similar to light-sources 2 and 3, arranged parallel to each other and perpendicular to the plane of the drawing in Figure 4. In this case each light source is provided with a cylindrical mirror and a cylindrical lens. More particularly, a cylindrical mirror 12 is arranged at the rear of light source 9 with its axis parallel thereto, and a cylindrical lens 15 is arranged in front of this light source with its axis perpendicular to the axis of the mirror 12. In a similar manner a mirror 13 and lens 16 are arranged with light source 10, and mirror 14 and lens 17 are arranged with light source 11.

In this arrangement the illumination cone illuminating a point R of the object 22 to be illuminated is constituted by three partially-flattened illumination cones having apical angles $t$, $u$ and $v$ respectively, which cones adjoin each other due to the special arrangement of the mirrors, lenses and light sources. Also in this arrangement, the transverse dimension of each of the light sources is extended by the action of mirrors 12, 13 and 14 so that they all exhibit the dimension $c$ at the point of projection in R. The length of each of the light sources (see Fig. 5) is such that the height dimension $d$ of the object to be illuminated is completely filled with light by the action of the cylindrical lenses 15, 16 and 17.

While we have described our invention with reference to specific examples and applications, we do not wish to be limited thereto, but desire the appended claims to be construed as broadly as is permissible in view of the prior art.

What we claim is:

1. A device for intensely illuminating a plane whose dimensions are in a ratio less than 10 to 1, comprising a plurality of linear light sources arranged parallel to each other in a row substantially transversely of the projection axis, means associated with each light source to enlarge the projected light and form light spots partly overlapping in the vicinity of the plane and each covering substantially the entire plane with light, said means comprising for each light source two cylindrical optical members arranged in the path of the light emitted from the source and spaced apart with their axes perpendicular to each other and with one axis parallel to the longitudinal axis of the light source, the illumination cones of the points of the plane consisting of a plurality of plane light cones each originating from one of the light sources.

2. A device for intensely illuminating a plane whose dimensions are in a ratio less than 10 to 1, comprising a plurality of linear light sources arranged parallel to each other in a row substantially transversely of the projection axis, means associated with each light source to enlarge the projected light and form light spots partly overlapping in the vicinity of the plane and each covering substantially the entire plane with light, said means comprising for each light source two cylindrical optical members arranged in the path of the light emitted from the source and spaced apart with their axes perpendicular to each other and with one axis parallel to the longitudinal axis of the light source, the illumination cones of the points of the plane consisting of a plurality of adjacent light cones each originating from one of the light sources.

3. A device for intensely illuminating a plane whose dimensions are in a ratio less than 10 to 1, comprising a plurality of linear light sources consisting of high-pressure mercury-vapor discharge tubes arranged parallel to each other in a row extending substantially transversely of the projection axis, means associated with each discharge tube to enlarge the projected light and form light spots partly overlapping in the vicinity of the plane and each covering substantially the entire plane with light, said means comprising for each discharge tube two cylindrical optical members arranged in the path of the light emitted from the source and spaced apart with their axes perpendicular to each other and with one axis parallel to the longitudinal axis of the light source, the illumination cones of the points of the plane consisting of a plurality of adjacent light cones each originating from one of the light sources.

4. A device for intensely illuminating the film gate of a projection system having a projection lens arranged behind the film gate, comprising a plurality of linear light sources arranged parallel to each other in a row substantially transversely of the projection axis, means associated with each light source to enlarge the projected light and form light spots partly overlapping in the vicinity of the film gate and each covering substantially the entire area of the film gate with light, said means comprising for each light source two cylindrical optical members arranged in the path of the light emitted from the source and spaced apart with their axes perpendicular to each other and with one axis parallel to the longitudinal axis of the light source, the illumination cones of the points of the film gate comprising a plurality of adjacent plane light cones each originating from one of the light sources, all of the light cones being located within the receiving angle of the projection lens.

5. A device for intensely illuminating a plane whose dimensions are in a ratio less than 10 to 1, comprising a plurality of linear light sources arranged parallel to each other in a row substantially transversely of the projection axis, means associated with each light source to enlarge the projected light and form light spots partly overlapping in the vicinity of the plane and each covering substantially the entire plane with light, the illumination cones of the points of the plane comprising a plurality of adjacent plane light cones each originating from one of the light sources, said means comprising for each light source two cylindrical lenses arranged spaced apart in optical alignment between the light source and plane, one of said lenses being arranged with its axis parallel to the light source and the other lens being arranged with its axis perpendicular to the light source.

6. A device for intensely illuminating a plane whose dimensions are in a ratio less than 10 to 1, comprising a plurality of linear light sources arranged parallel to each other in a row substantially transversely of the projection axis, optical means associated with each light source to enlarge the projected light and form light spots partly overlapping in the vicinity of the plane and each covering substantially the entire plane with light, the illumination cones of the points of the plane comprising a plurality of adjacent plane light cones each originating from one of the light sources, said means comprising for each light source a cylindrical lens arranged between the light source and plane and a cylindrical mirror arranged behind the light source, the axis of the cylindrical mirror being parallel to the light source and the axis of the lens being perpendicular to the light source.

7. A device for intensely illuminating a plane whose dimensions are in a ratio less than 10 to 1, comprising a plurality of light sources arranged parallel to each other in a row substantially transversely the projection axis, optical means associated with each light source to enlarge the projected light and form light spots partly overlapping in the vicinity of the plane and each covering substantially the entire plane with light, the illuminating cones of the points of the plane consisting of a plurality of adjacent plane light cones each originating from one of the light sources, said means comprising for each light source two cylindrical optical members arranged in the path of the light emitted by the source and spaced apart with their axes perpendicular to each other and with one axis parallel to the longitudinal axis of the light source, those optical members nearer the plane to be illuminated having their edges parallel to the longitudinal axis of the light sources arranged close together.

JAN BERGMANS.
CLAMOR AUGUST LAMBERTS.
PIETER MARTINUS van ALPHEN.